Dec. 27, 1955  E. C. QUACKENBUSH ET AL  2,728,895
SELF-LOCKING COUPLING DEVICE
Filed Oct. 4, 1954  2 Sheets-Sheet 1
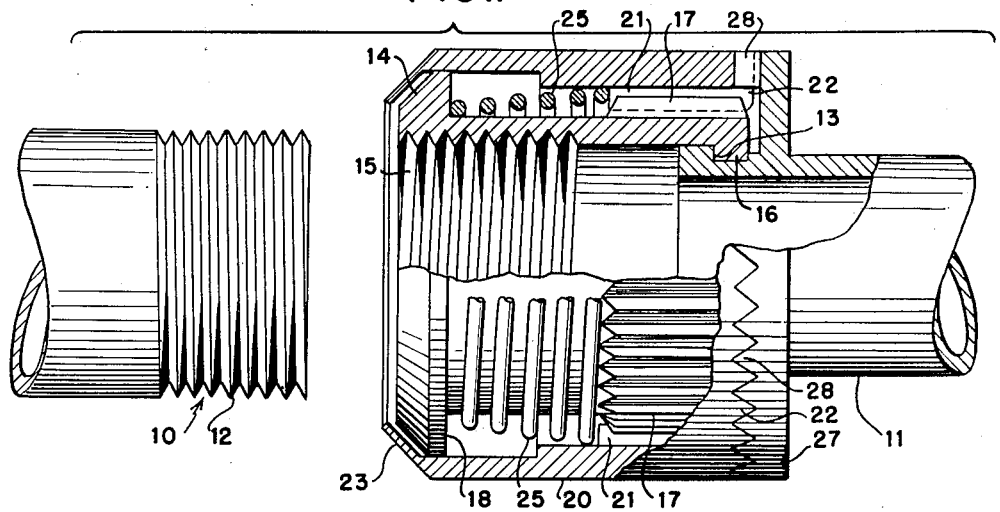
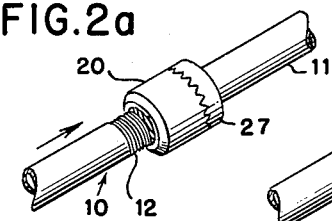
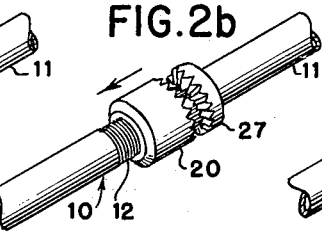
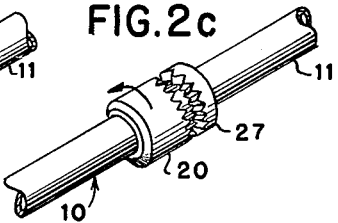
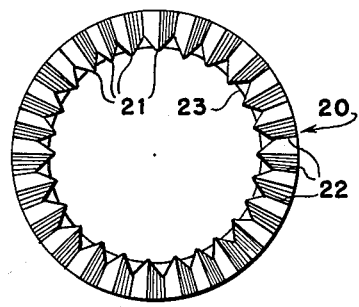
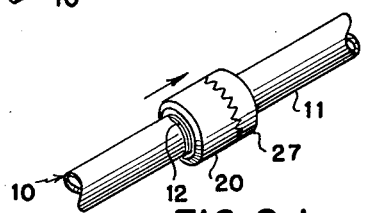
*INVENTORS*
Edward Clarke Quackenbush
Frank E. Runge
BY
*Adams, Forward & McLean*
ATTORNEYS Dec. 27, 1955   E. C. QUACKENBUSH ET AL   2,728,895
SELF-LOCKING COUPLING DEVICE
Filed Oct. 4, 1954   2 Sheets-Sheet 2

INVENTORS
Edward Clarke Quackenbush
Frank E. Runge
BY
Adams, Forward & McLean
ATTORNEYS

United States Patent Office 2,728,895
Patented Dec. 27, 1955

2,728,895

SELF-LOCKING COUPLING DEVICE

Edward Clarke Quackenbush, Hamden, and Frank E. Runge, Branford, Conn., assignors to Whitney Blake Company, New Haven, Conn., a corporation of Connecticut Application October 4, 1954, Serial No. 460,122

8 Claims. (Cl. 339—89)

Our invention relates generally to maintaining mechanical connection between a pair of elongated bodies, such as conduits, pipes and electrical connectors, in order to prevent inadvertent disconnection. In a more particular sense our invention relates to a self-locking coupling ring rotatably positioned on the end of one elongated body for receiving endwise and rotatably engaging the end of a second elongated body.

It has heretofore been common practice to employ a coupling nut to provide mechanical connection between the ends of elongated bodies, such as pipes and conduits and, particularly, axially mating multi-contact electrical connectors. Because engagement with the coupling nut is by sliding rotational movement and because the nut is held in place solely by friction, it is not uncommon to find the coupling nut will tend to loosen by rotating under the vibrational influences to which the connected bodies may be subjected. Usually where such a vibrational loosening occurs it has been prior practice to secure the coupling nut against inadvertent loosening by threading safety wire through a hole in the nut and a hole in a fixed member located near the connection, thereafter twisting the ends of the safety wire together, thus preventing accidental rotational movement of the coupling nut.

Such prior practice in securing a coupling nut in position has often been found unsatisfactory. Pliers and other tools are usually required to fasten the safety wire. The safety-wire coupling nut also cannot be readily removed without the use of the same tools. Very often the coupling nut must be installed in places in which manipulation of tools is difficult at best.

It is the principal object of this invention to provide a self-contained, self-locking, coupling ring which will permit ready connection of the ends of elongated bodies and will automatically set, in locked position, against rotational movement when the connection is completed, and which at the same time can be unlocked by hand to permit rapid disconnection when necessary.

It is a further object of our invention to provide a self-locking coupling ring of simple construction and having a minimum of parts, which will be light in weight and small in bulk, in which faulty operation is minimized and which locks automatically to minimize mistakes or forgetfulness.

It is a further object of our invention to provide a self-locking coupling ring which is particularly suitable for retaining together a pair of axially mating multi-contact electrical connectors.

These and other objects of our invention are essentially obtained by use of a locking sleeve which slidably engages the exterior of the coupling nut axially to prevent relative rotational displacement with respect to the coupling nut and which is spring biased to a position in which it also engages a member in fixed position with respect to the elongated body on which the coupling nut is mounted such that the sleeve and thus the coupling nut are prevented from relative rotational movement with respect to the elongated body.

For a more complete understanding, reference is made to the appended drawings of which the following is a description and in which:

Figure 1 is an elevational view of a pipe connection (shown disconnected) having a self-locking coupling ring constructed in accordance with our invention and shows certain parts partly cut away and sectioned;

Figure 2, subdivided into Figures 2a, 2b, 2c and 2d, illustrates in isometric views the manner of operation of the device shown in Figure 1;

Figure 4 is an end view of a part of the device shown in Figure 1;

Figure 3:
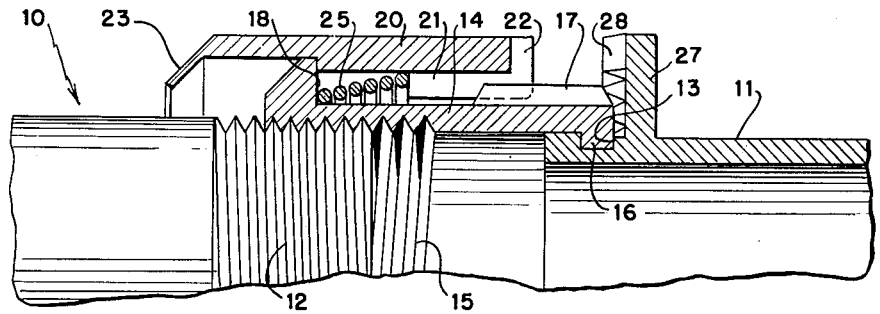
Figure 3 is a fragmentary, longitudinal, sectional view of the device shown in Figure 1 in the position illustrated in Figure 2c.

Referring to Figure 1 the reference numeral 10 refers to a pipe having threaded end 12, and the reference numeral 11 refers to a pipe having a coupling nut 14.

The end of pipe 11 is provided with a circumferential groove 13 in which an inwardly extending flange 16 at the non-engaging end of coupling nut 14 rests, thus permitting coupling nut 14 to rotate freely on the end of pipe 11. At its engaging end coupling nut 14 is internally threaded as indicated at 15 to receive and rotatably engage threads 12 on the end of pipe 10 to make connection between the ends of pipes 10 and 11.

Extending about the engaging end of coupling nut 14 is a shoulder 18. Disposed about the end of coupling nut 14 remote from its engaging end are a series of equally spaced longitudinal splines 17.

Coaxially positioned about coupling nut 14 is a sleeve 20. About the internal surface of sleeve 20 adjacent to splines 17 are a series of equally spaced longitudinal splines 21 which are positioned to engage slidingly longitudinal splines 17 on the exterior of coupling nut 14. Each spline 21, at the end of sleeve 20 remote from the engaging end of coupling nut 14, is extended in a radial direction providing a series of radial splines 22 (see Figure 4). The end of sleeve 20 adjacent to the engaging end of nut 14 is tapered inwardly at 23 to limit axial sliding movement of sleeve 20 away from the engaging end of coupling nut 14.

A coil spring 25 is positioned under compression within the space between sleeve 20 and coupling nut 14 abutting at one end against shoulder 18 on coupling nut 14 and abutting at its other end against the ends of splines 21 on the interior surface of sleeve 20. Coil spring 25 thus normally biases sleeve 20 in a direction away from the engaging end of coupling nut 14.

A flange 27 is affixed about pipe 11 and is integrally formed therewith. Flange 27 is positioned a short distance from the end of coupling nut 14 remote from its engaging end and extends radially to provide a surface adjacent to the end of sleeve 20 carrying radial splines 22. Flange 27 on its face adjacent to sleeve 20 is provided with a series of radial splines 28 which are spaced to receive radial splines 22 just short of the limit of travel of sleeve 20 away from the engaging end of coupling nut 14.

In operation threaded end 12 of pipe 10 is brought up to the open center of coupling nut 14 (see Figure 2a). Sleeve 20 is then manually extended against the biasing of spring 25 to disengage radial splines 22 from radial splines 28 and permit free rotational movement of clutch sleeve 20 and in turn of coupling nut 14 (see Figure 2b). Clutch sleeve 20 is then rotated in a direction producing rotation of coupling nut 14 to engage internal threads 15 on coupling nut 14 with threads 12 on pipe 10. This rotational movement is continued until the coupling nut firmly receives the end of pipe 10 (see Figures 2c and 3). Clutch sleeve 20 is then released and under the biasing of coil spring 25 slides back against flange 27 to cause radial splines 22 to re-engage radial splines 28 and lock clutch sleeve 20 and coupling nut 14 against accidental rotational movement which would tend to loosen the coupling (see Figure 2d).

Figure 5:
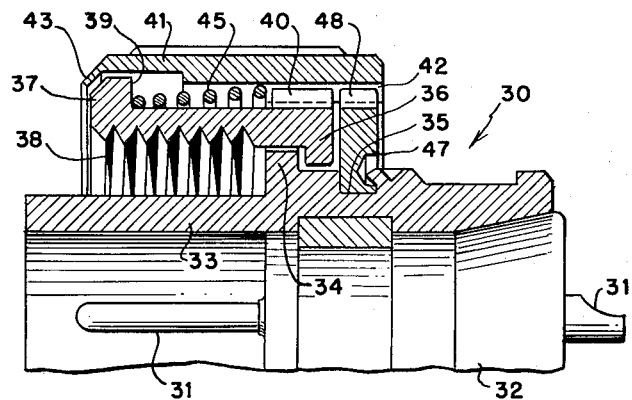
Figure 5 is a fragmentary, longitudinal, sectional view of a multi-contact electrical connector plug having a coupling ring constructed in accordance with our invention.

Referring to Figure 5 in which another device is shown, the reference numeral 30 represents a multi-contact connector plug for axially mating with a connector receptacle (not shown) of conventional construction.

Connector plug 30 includes a plurality of contact pins 31 affixed in a resilient insert 32 which is retained within the plug shell 33. Plug shell 33 extends substantially beyond the end of insert 32 covering pins 31 where they extend from insert 32 in the conventional manner. Suitably shell 33 where it extends over contact pins 31 is provided with a longitudinal slot for receiving a mating longitudinal key in the receptacle shell to prevent rotational movement of the connectors when assembled.

Shell 33 is provided with a circumferential, external, radial flange 34 located intermediate the ends of shell 33 and a circumferential groove 35 spaced close to flange 34 toward the end of shell 33 remote from its engaging end. Between flange 34 and groove 35 is seated an inwardly extending flange 36 at the non-engaging end of a coupling nut 37, thus permitting coupling nut 37 to rotate freely about the engaging end of shell 33. At its engaging end coupling nut 37 is internally threaded as indicated at 38 to receive and rotatably engage threads on the receptacle shell (not shown) and thus secure connection between the receptacle and plug 30.

Extending about the engaging end of coupling nut 37 is a shoulder 39. Disposed about the end of coupling nut 37 remote from its engaging end are a series of equally spaced longitudinal splines 40.

Coaxially positioned about coupling nut 37 is a sleeve 41 having a knurled exterior. About the internal surface of sleeve 41 adjacent to splines 40 are a series of equally spaced longitudinal splines 42 which are positioned to engage slidingly longitudinal splines 40 on the exterior of coupling nut 37. The end of sleeve 41 adjacent to the engaging end of nut 37 is peened over at 43 to limit axial sliding movement of sleeve 41 away from the engaging end of coupling nut 37.

A coil spring 45 is positioned within the space between sleeve 41 and coupling nut 37 abutting at one end against shoulder 39 on coupling nut 37 and abutting at its other end against the ends of splines 42 on the interior surface of sleeve 41. Coil spring 45 thus normally biases sleeve 41 in a direction away from the engaging end of coupling nut 37.

An annular disc 47 is fitted about shell 33 in groove 35 and is secured against rotational movement. Disc 47 is thus positioned close to the end of coupling nut 37 remote from its engaging end and extends radially to provide an outer edge surface adjacent to the inner surface of sleeve 41 and splines 42. Disc 47 on its outer edge is provided with a series of longitudinal splines 48 which are spaced to engage slidingly splines 42 just short of the limit of travel of sleeve 41 away from the engaging end of coupling nut 37.

In operation the threaded end of a receptacle shell is inserted axially between coupling nut 37 and plug shell 33 with the slot in 33 receiving the key on the receptacle shell. Sleeve 37 is then manually extended against the biasing of spring 45 to disengage splines 42 from splines 48 and to permit free rotational movement of sleeve 41 and in turn of coupling nut 37. Sleeve 41 is then rotated to engage internal threads 38 on coupling nut 37 with the threads on the receptacle shell. This rotational movement is continued until the coupling nut firmly receives the receptacle shell. Sleeve 41 is then released and under the biasing of coil spring 45 slides back to re-engage splines 42 and 48 and lock sleeve 41 and coupling nut 37 against accidental rotational movement which would tend to loosen the coupling.

Figure 6:
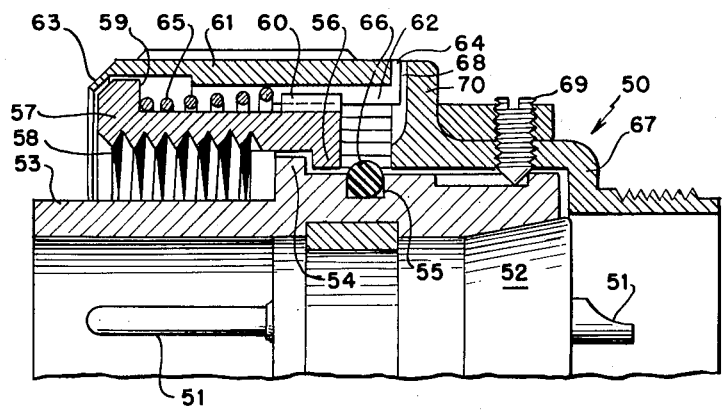
Figure 6 is a fragmentary, longitudinal, sectional view of another multi-contact electrical connector plug having a coupling ring constructed in accordance with our invention.

Referring to Figure 6, another multi-contact connector plug 50 is shown. Multi-contact connector plug 50 is designed to mate axially with a connector receptacle (not shown) of conventional construction.

Connector plug 50 includes a plurality of contact pins 51 affixed in a resilient insert 52 which is retained within the plug shell 53. Plug shell 53 extends substantially beyond the end of insert 52 covering pins 51 where they extend from insert 52 in the conventional manner. Suitably shell 53 where it extends over contact pins 51 is provided with a longitudinal slot for receiving a mating longitudinal key in the receptacle shell to prevent rotational movement of the connectors when assembled.

Shell 53 is provided with a circumferential, external, radial flange 54 located intermediate the ends of shell 53 and a circumferential groove 55 spaced close to flange 54 toward the end of shell 53 remote from its engaging end. Between flange 54 and groove 55 is seated an inwardly extending flange 56 at the non-engaging end of a coupling nut 57, thus permitting coupling nut 57 to rotate freely about the engaging end of shell 53. A clip-ring 66 is positioned about shell 53 in groove 55 to assure proper seating of flange 56. At its engaging end coupling nut 57 is internally threaded as indicated at 58 to receive and rotatably engage threads on the receptacle shell (not shown) and thus secure connection between the receptacle and plug 50.

Extending about the engaging end of coupling nut 57 is a shoulder 59. Disposed about the end of coupling nut 57 remote from its engaging end are a series of equally spaced longitudinal splines 60.

Coaxially positioned about coupling nut 57 is a sleeve 61 having a knurled exterior. About the internal surface of sleeve 61 adjacent to splines 60 are a series of equally spaced longitudinal splines 62 which are positioned to engage slidingly longitudinal splines 60 on the exterior of coupling nut 57. Each spline 62 at the end of sleeve 61 remote from the engaging end of coupling nut 57 is extended in a radial direction providing a series of radial splines 64. The end of sleeve 61 adjacent to the engaging end of nut 57 is peened over at 63 to limit axial sliding movement of sleeve 61 away from the engaging end of coupling nut 57.

A coil spring 65 is positioned within the space between sleeve 61 and coupling nut 57 abutting at one end against shoulder 59 on coupling nut 57 and abutting at its other end against the ends of splines 62 on the interior surface of sleeve 61. Coil spring 65 thus normally biases sleeve 61 in a direction away from the engaging end of coupling nut 57.

A cylindrical extension adaptor 67 is placed over the non-engaging end of shell 53 and is held in fixed position by a plurality of set screws 69 which threadedly engage adaptor 67 and bear inwardly against the exterior of shell 53. Adaptor 67 at its end nearer nut 57 is provided with an integrally formed flange 70 which extends radially to provide a radial surface adjacent to the end of sleeve 61 carrying radial splines 64. Flange 70 on its side adjacent to sleeve 61 is provided with a series of radial splines 68 which are spaced to receive radial splines 64 just short of the limit of travel of sleeve 61 away from the engaging end of coupling nut 57.

In operation plug 50 is axially mated with a receptacle in the same manner as plug 30. Thereafter, sleeve 61 is manually extended against the biasing of spring 65 and coupling nut 57 is engaged with the threaded end of the receptacle and locked in position in the same manner coupling nut 14 is engaged with the threaded end 12 of pipe 10.

We claim:

1. A self-locking coupling device for retaining connection between a pair of elongated members which comprises a coupling nut mounted about the end of one of said elongated members for rotational movement about said end and having an open center for receiving endwise and rotatably engaging the end of the second elongated member, a locking sleeve positioned about said nut, means projecting inwardly from the inner surface of said sleeve, means complementary to said projecting means on the outer surface of said nut axially slidably engaging said projecting means and being rotatable therewith, means fixed in position about said first elongated member close to the non-engaging end of said coupling nut and having a surface extending adjacent to a portion of said locking sleeve for receiving and axially engaging said locking sleeve at a position of said locking sleeve extended from the engaging end of said coupling nut, and resilient means biasing said locking sleeve relative to said coupling nut toward said position engaging said means fixed about said first elongated member.

2. A self-locking coupling device for retaining connection between a pair of elongated members which comprises a coupling nut mounted about the end of one of said elongated members for rotational movement about said end and having an open center for receiving endwise and rotatably engaging the end of the second said elongated member, a plurality of longitudinal splines spaced about said coupling nut, a locking sleeve positioned about said nut, a plurality of longitudinal splines on the interior surface of said sleeve spaced to engage slidably said splines on said nut axially, means fixed in position about said first elongated member close to the non-engaging end of said coupling nut and having a surface extending adjacent to a portion of said locking sleeve for receiving and axially engaging said locking sleeve at a position of said locking sleeve extended from the engaging end of said coupling nut, and resilient means biasing said locking sleeve relative to said coupling nut toward said position engaging said means fixed about said first elongated member.

3. A self-locking coupling device for retaining connection between a pair of elongated members which comprises a coupling nut mounted about the end of one of said elongated members for rotational movement about said end and having an open center for receiving endwise and rotatably engaging the end of the second said elongated member, a plurality of longitudinal splines spaced about said coupling nut, a locking sleeve positioned about said nut, a plurality of longitudinal splines on the interior surface of said sleeve spaced to engage slidably said splines on said nut axially, means fixed in position about said first elongated member close to the non-engaging end of said coupling nut and having an outer edge surface extending adjacent to a portion of said splines on said locking sleeve, a plurality of longitudinal splines about said outer edge surface spaced to receive and axially engage said splines on said locking sleeve at a position of said locking sleeve extended from the engaging end of said coupling nut, and resilient means biasing said locking sleeve relative to said coupling nut toward said position engaging said splines on said sleeve and said splines on said outer edge surface.

4. A self-locking coupling device for retaining connection between a pair of elongated members which comprises a coupling nut mounted about the end of one of said elongated members for rotational movement about said end and having an open center for receiving endwise and rotatably engaging the end of the second said elongated member, a plurality of longitudinal splines spaced about said coupling nut, a locking sleeve positioned about said nut, a plurality of longitudinal splines on the interior surface of said sleeve spaced to engage slidably said splines on said nut axially, a plurality of radial splines on the end of said sleeve remote from the engaging end of said nut, means fixed in position about said first elongated member close to the non-engaging end of said coupling nut and having a radial surface extending adjacent to the splined end portion of said locking sleeve, a plurality of radial splines on said radial surface spaced to receive and axially engage said radial splines on said locking sleeve at a position of said locking sleeve extended from the engaging end of said coupling nut, and resilient means biasing said locking sleeve relative to said coupling nut toward said position engaging said radial splines on said sleeve and said radial splines on said radial surface.

5. A self-locking coupling device for retaining connection between a pair of axially engaging multi-contact connectors which comprises a multi-contact electrical connector having a plurality of contacts extending lengthwise in a resilient insert housed within a receptacle shell, a coupling nut mounted about the engaging end of said shell for rotational movement about said end and having an open center for receiving endwise and rotatably engaging the end of a mating connector, a locking sleeve positioned about said nut, means projecting inwardly from the inner surface of said sleeve, means complementary to said projecting means on the outer surface of said nut axially slidably engaging said projecting means and being rotatable therewith, means fixed in position about said shell close to the non-engaging end of said coupling nut and having a surface extending adjacent to a portion of said locking sleeve for receiving and axially engaging said locking sleeve at a position of said locking sleeve extended from the engaging end of said coupling nut, and resilient means biasing said locking sleeve relative to said coupling nut toward said position engaging said means fixed about said shell.

6. A self-locking coupling device for retaining connection between a pair of axially engaging multi-contact connectors which comprises a multi-contact electrical connector having a plurality of contacts extending lengthwise in a resilient insert housed within a receptacle shell, a coupling nut mounted about the engaging end of said shell for rotational movement about said end and having an open center for receiving endwise and rotatably engaging the end of a mating connector, a plurality of longitudinal splines spaced about said coupling nut, a locking sleeve positioned about said nut, a plurality of longitudinal splines on the interior surface of said sleeve spaced to engage slidably said splines on said nut axially, means fixed in position about said shell close to the non-engaging end of said coupling nut and having a surface extending adjacent to a portion of said locking sleeve for receiving and axially engaging said locking sleeve at a position of said locking sleeve extended from the engaging end of said coupling nut, and resilient means biasing said locking sleeve relative to said coupling nut toward said position engaging said means fixed about said shell.

7. A self-locking coupling device for retaining connection between a pair of axially engaging multi-contact connectors which comprises a multi-contact electrical connector having a plurality of contacts extending lengthwise in a resilient insert housed within a receptacle shell, a coupling nut mounted about the engaging end of said shell for rotational movement about said end and having an open center for receiving endwise and rotatably engaging the end of a mating connector, a plurality of longitudinal splines spaced about said coupling nut, a locking sleeve positioned about said nut, a plurality of longitudinal splines on the interior surface of said sleeve spaced to engage slidably said splines on said nut axially, means fixed in position about said shell close to the non-engaging end of said coupling nut and having an outer edge surface extending adjacent to a portion of said splines on said locking sleeve, a plurality of longitudinal splines about said outer edge surface spaced to receive and axially engage said splines on said locking sleeve at a position of said locking sleeve extended from the engaging end of said coupling nut, and resilient means biasing said locking sleeve relative to said coupling nut toward said position engaging said splines on said sleeve and said splines on said outer edge surface.

8. A self-locking coupling device for retaining connection between a pair of axially engaging multi-contact connectors which comprises a multi-contact electrical connector having a plurality of contacts extending lengthwise in a resilient insert housed within a receptacle shell, a coupling nut mounted about the engaging end of said shell for rotational movement about said end and having an open center for receiving endwise and rotatably engaging the end of a mating connector, a plurality of longitudinal splines spaced about said coupling nut, a locking sleeve positioned about said nut, a plurality of longitudinal splines on the interior surface of said sleeve spaced to engage slidably said splines on said nut axially, means fixed in position about said shell close to the non-engaging end of said coupling nut and having a radial surface extending adjacent to the splined end portion of said locking sleeve, a plurality of radial splines on said radial surface spaced to receive and axially engage said radial splines on said locking sleeve at a position of said locking sleeve extended from the engaging end of said coupling nut, and resilient means biasing said locking sleeve relative to said coupling nut toward said position engaging said radial splines on said sleeve and said radial splines on said radial surface.

References Cited in the file of this patent

UNITED STATES PATENTS

| | | |
|---|---|---|
| 809,746 | Rhoads | Jan. 9, 1906 |
| 2,245,847 | Bagby | June 17, 1941 |
| 2,383,109 | Conlan | Aug. 21, 1945 |
| 2,438,313 | Burton | Mar. 3, 1948 |